United States Patent [19]
Duffett-Smith et al.

[11] Patent Number: 5,838,279
[45] Date of Patent: Nov. 17, 1998

[54] NAVIGATION AND TRACKING SYSTEM FOR SHIELDED SPACES

[75] Inventors: Peter James Duffett-Smith; Graham Woan, both of Cambridge, United Kingdom

[73] Assignee: Cambridge Positioning Systems Limited, Cambridge, United Kingdom

[21] Appl. No.: 553,492

[22] PCT Filed: May 26, 1994

[86] PCT No.: PCT/GB94/01145

§ 371 Date: Nov. 20, 1995

§ 102(e) Date: Nov. 20, 1995

[87] PCT Pub. No.: WO94/28432

PCT Pub. Date: Dec. 8, 1994

[30] Foreign Application Priority Data

May 27, 1993 [GB] United Kingdom .................... 9310976

[51] Int. Cl.⁶ ....................................................... G01S 3/02
[52] U.S. Cl. ........................................... 342/459; 324/329
[58] Field of Search .................................... 342/459, 442; 324/329

[56] References Cited

U.S. PATENT DOCUMENTS 5,430,379   7/1995   Parkinson et al. ....................... 324/329

FOREIGN PATENT DOCUMENTS

| 0004003 | 9/1979 | European Pat. Off. . |
| 0303371 | 2/1989 | European Pat. Off. . |
| 9100531 | 1/1991 | WIPO . |

OTHER PUBLICATIONS

Patent Abstracts of Japan, vol. 16, No. 125 (P–1331), Dated Mar. 30, 1992, and Japanese Patent Publication No. 3–291, 582, Dated Dec. 20, 1991.

Patent Abstracts of Japan, vol. 12, No. 111 (E–598), Dated Apr. 8, 1988, and Japanese Patent Publication No. 62–242427, Dated Oct. 23, 1987.

P.J. Duffett–Smith & G. Woan, "The CURSOR Radio Navigation and Tracking System", *Journal of Navigation*, vol. 45, No. 2, pp. 157–165 (1992).

*Primary Examiner*—Theodore M. Blum
*Attorney, Agent, or Firm*—Roylance, Abrams, Berdo & Goodman, L.L.P.

[57] ABSTRACT

A navigation and/or tracking system has a base station B and a roving receiver R both of which are capable of receiving signals from a plurality of transmission sources Tx1,Tx2. A link signal W,W' is passed between the base station and the roving receiver to enable the relative location of the roving receiver to be determined. The apparatus enables the determination of the position of the roving receiver within a space (such as a tunnel T) shielded from receipt of signals from the transmission sources and has equipment P,Q for producing substitute signals, each signal being locked in phase with a signal from a respective one of the transmission sources. A curvilinear transmission element or elements F,F',F", extend within the shielded space T for generating fields in the shielded space. The equipment P,Q propagates at least two of the substitute signals in opposite directions along the curvilinear transmission element or elements for receipt by the roving receiver R. Additional equipment S passes the link signal W' between the roving receiver and the base station B within the shielded space.

19 Claims, 6 Drawing Sheets

NAVIGATION AND TRACKING SYSTEM FOR SHIELDED SPACES

The invention relates to a navigation and tracking system which can be used in shielded spaces.

EP-B-0 303 371 describes a navigation and tracking system (CURSOR™) in which the signals from several independent point signal sources (eg. radio transmitters) are received at two locations, one being at a fixed and known location (the "base station"), and the other being attached to the roving object whose position is to be determined (the "rover"). A representation of the signals received at one of the locations, A, is sent by any convenient means (e.g., a narrow-band radio link) to the other, B, where the said representation is used in a computer program to calculate the position of the rover, together with a similar representation derived from the same signal sources at B.

In cases where location in real time is not required, the link may be the transmission of data by physical means such as a floppy disk.

This system has particular advantages over other (radio) navigation and tracking systems but, in common with all such systems, it suffers from the drawback that the signals do not usually penetrate far into tunnels and other shielded spaces, and hence the continuous tracking of a roving object is interrupted whilst it is inside such a space.

The CURSOR™ system already incorporates a tunnel-recovery procedure whereby the correct operation of the system may be quickly re-established after such an interruption (P J Duffett-Smith & G Woan, 1991 *Journal of Navigation Vol.*45 No.2 pages 157–165, 1992). However, this is different from maintaining tracking of the rover within the tunnel or the like and some additional means is required if this is necessary for the particular purposes of the system.

According to a first aspect of the present invention there is provided apparatus for use with a navigation and tracking system having a base station and a roving receiver both of which receive signals from a plurality of transmission sources, and between which a link signal is passed to enable the relative location of the roving receiver to be determined, the apparatus enabling the determination of the position of the roving receiver within a space shielded from direct receipt of signals from the transmission sources and comprising means for producing substitute or replica signals, each signal being locked in phase with a signal from a respective one of the transmission sources; a curvilinear transmission element, extending within the shielded space for generating fields in the shielded space; means for propagating at least two of the substitute signals in opposite directions along the curvilinear transmission element for receipt by the roving receiver; and means for passing the link signal between the roving receiver and the base station.

If necessary in a particular application, the signals propagated along the curvilinear transmission element may also be received by the base station.

The invention also includes a navigation and tracking system having a base station and a roving receiver both of which are capable of receiving signals from a plurality of transmission sources, and between which a link signal is passed to enable the relative location of the roving receiver to be determined, and including such apparatus.

The means for passing the link signal between the roving receiver and the base station may includes means for receiving signals from the rover within the shielded space.

As described in EP-B-0 303 371, the transmission signals may be modulated and timing delays between the respective signals may be determined in order to enable the relative location of the roving receiver to be determined, in which case the substitute signals may replicas of the transmitted signals, the system including means for comparing the signals received by the base station and roving receiver, which includes means for correlating the signals to produce estimates of the cross-correlation function to determine the time delay between the signals.

Alternatively, the signals may be modulated or unmodulated and the phase difference determined.

A substantially similar strategy can be used for a navigation and tracking system operating wholly within a shielded space and therefore, in accordance with a second aspect of the invention, there is provided a navigation and tracking system for location finding within an shielded space, the apparatus having a base station and a roving receiver, both of which receive signals from a plurality of signal generators, and between which a link signal is passed to enable the relative location of the roving receiver to be determined, one or more curvilinear transmission elements extending within the shielded space for generating fields in the shielded space; means for propagating the generated signals in opposite directions along the curvilinear transmission element or elements for receipt by the roving receiver; and means for passing a link signal, representative of the signals received by the rover or base station, between the roving receiver and the base station; and means for comparing the signal representations received via the link with the signal directly received, in order to determine the location of the rover. Similar types of signals may be used as in a conventional CURSOR™ system.

If necessary in a particular application, the signals propagated along the curvilinear transmission element may also be received by the base station.

In this specification we describe how the CURSOR system, and others like it, can be made to operate successfully inside the shielded space itself once simple equipment has been installed therein. We also describe how a CURSOR-based system can be designed to work solely within a shielded space or in the vicinity of an extended transmission element.

A radio-based CURSOR system measures the spacial coherence between two points of the signals from a number of transmitters. Three such measurements are needed for navigation and tracking in two dimensions, since three simultaneous equations must be solved to evaluate the three unknown quantities x,y and $\epsilon$, where (x,y) is the two-dimensional position of the rover and $\epsilon$ is a varying time offset between the master oscillators in the base station and the rover. Where operation within a tunnel is required, it is usually sufficient to determine only the rover's distance, l, from one end. In that case, independent measurements of the wave fields of just two transmitters are needed. These wave fields are established inside the tunnel using a curvilinear structure fixed inside the tunnel and running from one end to the other, such as a "leaky" cable, or a finite number of point sources spaced along the length of the tunnel. The necessary link between the base station and the rover can be achieved using a leaky cable, a number of point sources or detectors or, where post-real time tracking is required, a recording medium such as a floppy disk.

Examples of systems according to the present invention will now be described with reference to the accompanying drawings, in which:

FIG. 1 is a diagrammatic representation of a CURSOR™ system showing operation both inside and outside a tunnel;

FIGS. 2*a* & 2*b* illustrate the geometry of a CURSOR™ system;

FIG. 6 illustrates the geometry of the system of FIG. 4a; and

Figure 1:
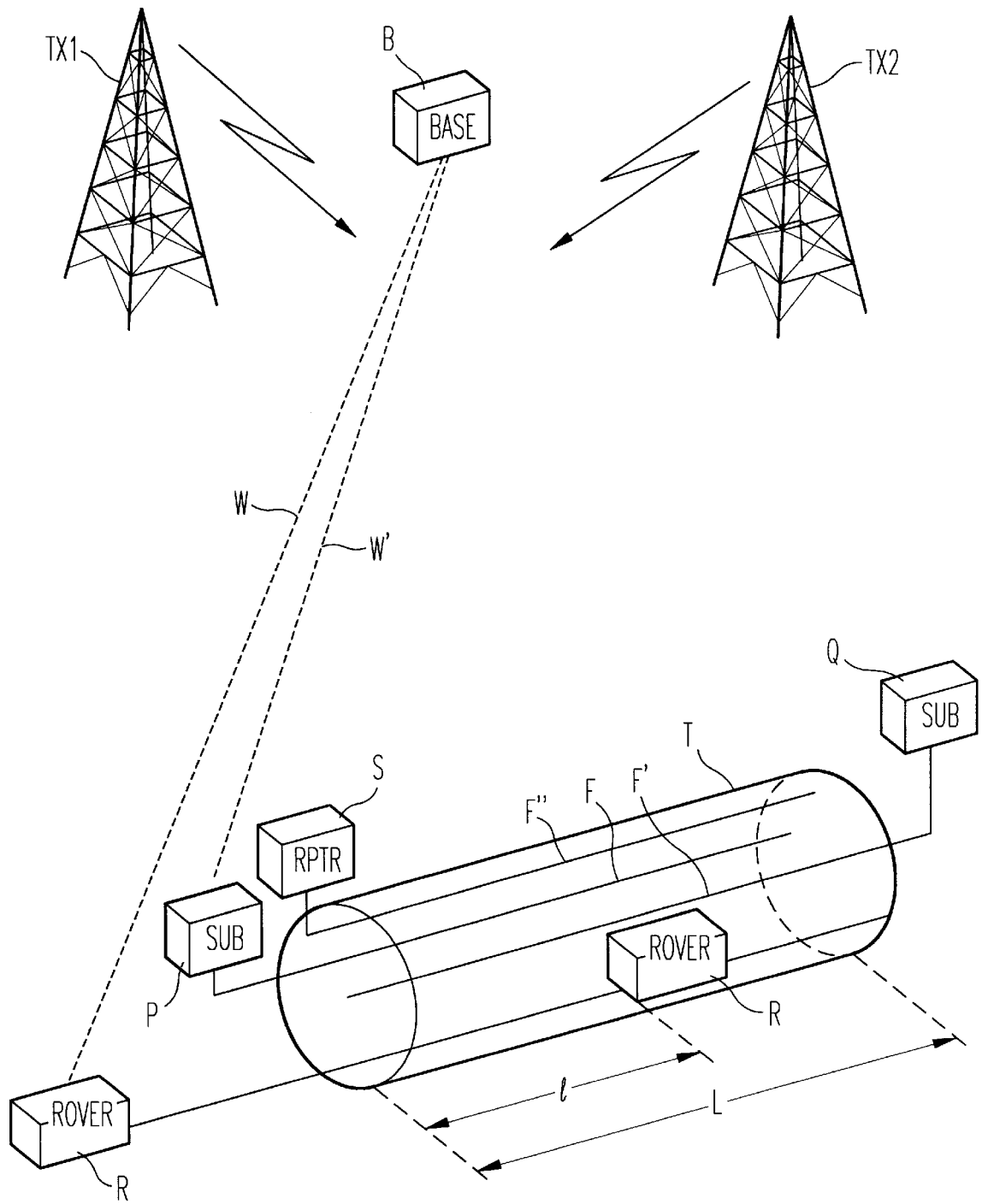

Operation of a CURSOR™ system is illustrated in FIG. 1. The position of a rover R is tracked continuously using several independent signal sources, two of which are marked T×1 and T×2. When the rover R is outside a tunnel T there is a radio link W between the rover R and a base station B. If the position calculations are being made at the base station B, the link conveys a representation of the signals received by the rover R, but if the position calculations are being made in the rover R, the link conveys a representation of the signals received by the base station B. In either case, the link may also be used to report the calculated position to the other location.

The CURSOR™ system operates conventionally outside the tunnel T, but as it enters the tunnel the signals received directly from the signal sources T×1 and T×2, and from the link signal W quickly fade out. They are replaced by signals generated locally in equipment P, Q and S and propagated inside the tunnel from curvilinear structures F,F', & F". Equipment P generates a substitute signal derived from that received directly from T×1; Q does likewise with the signal from T×2. The substitute signal may be an exact replica of the received signal, or it may be a part of it, or it may be another signal. In any case, the substitute signal is locked in phase with the directly received signal. Other equipment (not shown) can produce substitute signals for all the other signal sources being used by the CURSOR™ system. A link W' between the base station B and the rover R is maintained via equipment S which acts as a repeater while the rover R is inside the tunnel. Curvilinear structures F, F' and F" may all be the same physical entity if convenient.

Figure 2A:
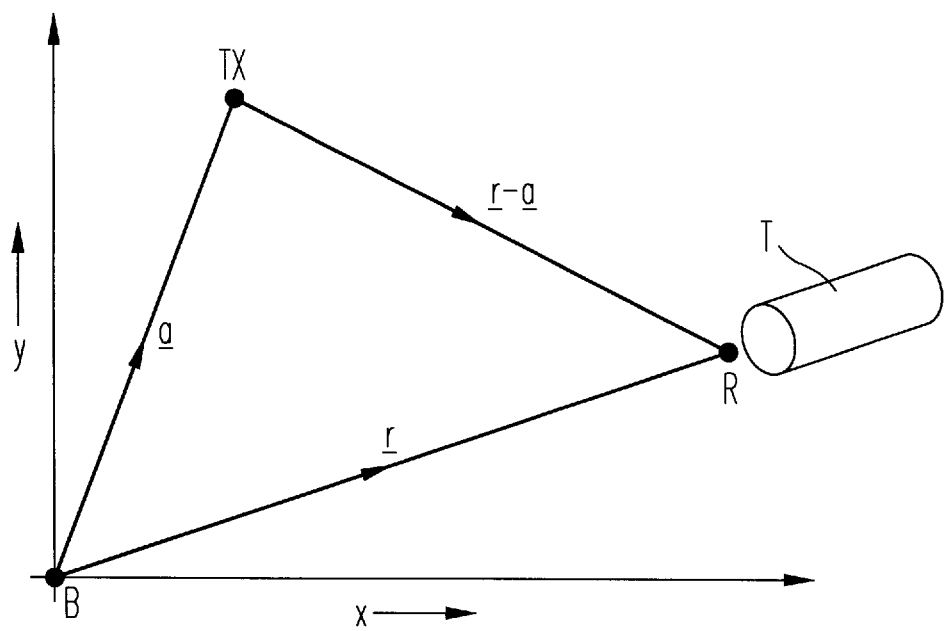
Figure 2B:
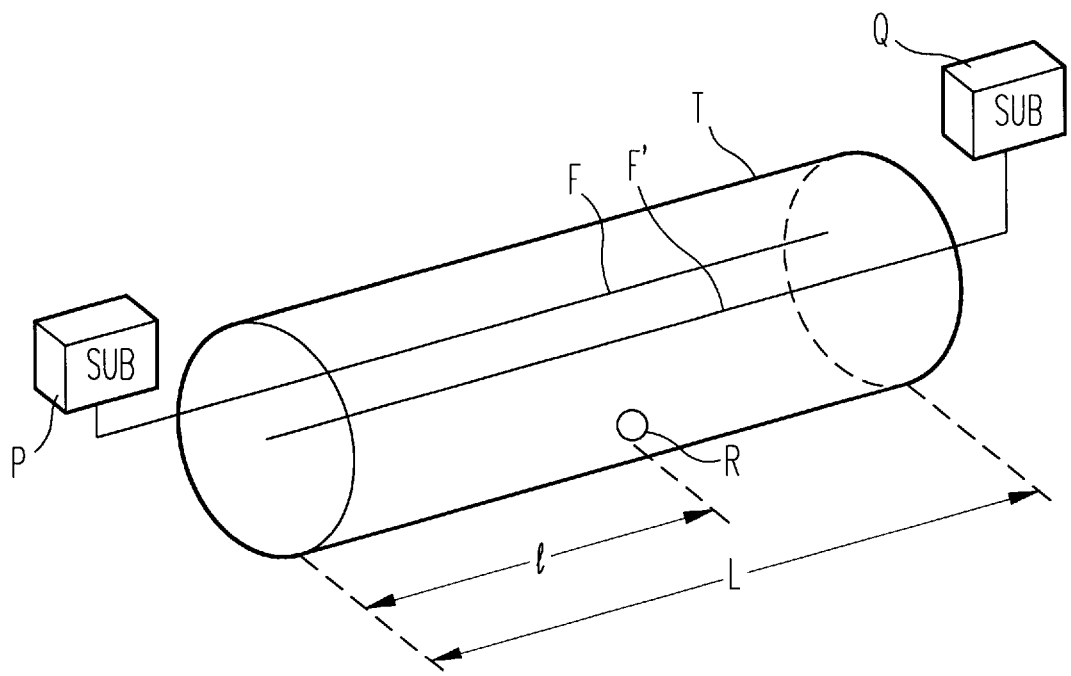

The geometry of a CURSOR™ system is shown in FIGS. 2a & 2b. FIG. 2a depicts normal operation where the signals from a signal source, Tx, at vector position a, are received by the base station B at the origin of coordinates, and by the rover R at vector position r. If N such signal sources are being used, then N independent measurements of the phase difference, $\Delta\phi$, between base and rover are made, such that $$\Delta\phi_i = \omega_i \left( \frac{|r - a_i|}{c} - \frac{|a_i|}{c} + \epsilon \right), \quad (1)$$

where the subscript i denotes the channel number (1 to N), $\omega_i$ the angular frequency of the signals, and c the speed of the waves. The entrance to the tunnel and hence the position of P can be considered as being at such a position that $|r-a_1|=d_1$ and also, it can be considered that $|a_1|=a_1$. Then as the rover R enters the tunnel T we have $$\Delta\phi_1 = \omega_1 \left( \frac{d_1 - a_1}{c} + \epsilon \right). \quad (2)$$

The geometry of operation inside the tunnel T is shown in FIG. 2b. The rover R picks up the signals generated by the curvilinear structure F at distance l inside the tunnel, and hence the phase difference measured between base station B and rover R becomes $$\Delta\phi_{1t} = \omega_1 \left( \frac{d_1 - a_1}{c} + \frac{l}{c'} + \epsilon \right), \quad (3)$$

where c' is the wave speed on the curvilinear structure F. If the exit to the tunnel and hence the position of Q are considered to be at position $|r-a_2|=d_2$ and $|a_2|=a_2$, then the phase difference measured on the signals from source T×2 inside the tunnel T is $$\Delta\phi_{2t} = \omega_2 \left( \frac{d_2 - a_2}{c} + \frac{L - l}{c'} + \epsilon \right), \quad (4)$$

where L is the total length of the curvilinear structure F'. As has already been mentioned, F and F' could be the same physical entity. Equations (3) and (4) can be solved for values of l and $\epsilon$, and hence the linear distance inside the tunnel T can be found. The equations are:

$$l = \frac{c'(d_2 - d_1 - a_2 - a_1) + cL}{2c} + \frac{c'(\omega_2 \Delta\phi_1 - \omega_1 \Delta\phi_2)}{2\omega_1 \omega_2}, \quad (5)$$

$$\epsilon = \frac{c'(a_1 + a_2 - d_1 - d_2) - cL}{2cc'} + \frac{\omega_2 \Delta\phi_1 + \omega_1 \Delta\phi_2}{2\omega_1 \omega_2}, \quad (6)$$

It is not necessary for equipment Q to be placed at the far end of the tunnel, but merely that its signals, proceeding along the curvilinear structure F', come from the far end. If equipment Q is co-located with equipment P (which may be desirable from a practical point of view), the signals from Q can be sent by screened cable to the other end of the tunnel before being injected into the curvilinear structure F'. This arrangement has several advantages, including the fact that the phase fields for both channels 1 and 2 can be made to vary smoothly in the transition region from outside to inside the tunnel. It may not be possible to make a smooth transition on these channels at the far end as well. In a practical application, several of the channels would be serviced by equipment at the entrance end, and the rest by equipment at the exit end, so that continuous operation of CURSOR™ would be ensured. During passage of the rover R through the tunnel T, the channels not being used for in-tunnel measurement would re-lock to signals propagated inside the tunnel from equipment at the exit end, and hence would have their correct phases on exit, so that normal operation would be resumed immediately the rover R leaves the tunnel T.

Figure 3:
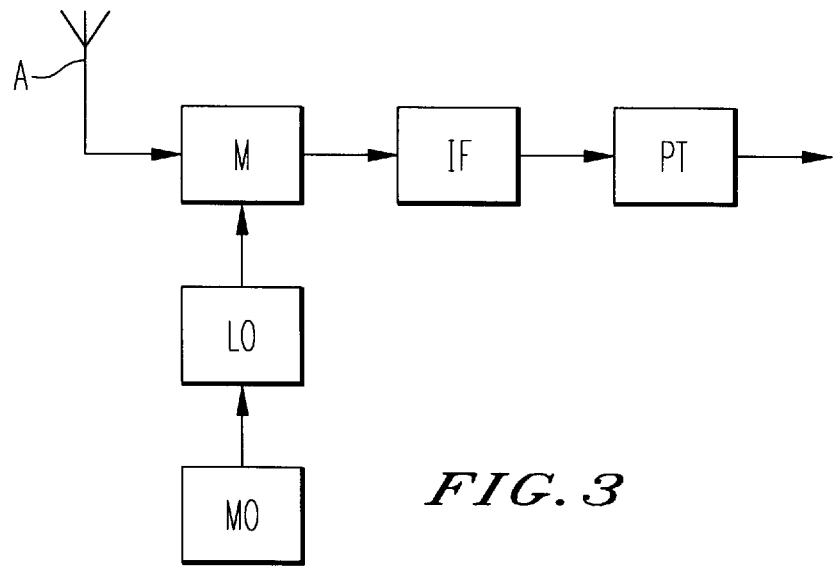
FIG. 3 shows a block diagram of a particular CURSOR receiver.

In one practical implementation of a CURSOR™ system, eight medium wave (550–1600 kHz) public broadcast AM transmitters are used to monitor the position of a mobile vehicle (rover R). Signals from the eight transmitters are received at the base station B and at the rover R by narrow-band multi-channel receivers. A block diagram of one channel is shown in FIG. 3. The incoming radio signal on each channel is picked up by a common antenna A and passed to a mixer M where it is mixed with a sinusoid generated by a local oscillator LO which is locked in phase with a common crystal-controlled master oscillator MO. That component of the mixer output corresponding to the carrier wave is another sinusoid whose frequency is the difference between the received carrier frequency and the local oscillator frequency. This signal is amplified in an intermediate frequency amplifier IF and then passed to a phase-tracker PT. Its phase is tracked by PT through complete cycles and stored as a number which changes with time. This number is sent over the link from the base station to the rover every few seconds.

At the receiving end of the link (the rover R in this case), the locally-measured phases are compared with those received over the link from the transmitting end (the base B) on each of the eight channels. The differences reflect both the movement of the rover R and the drift between the master oscillators at the base B and rover R. As already described, these phase differences are used to compute the movement of the rover R in a similar manner to that described in EP-B-0 303 371.

Figure 4:
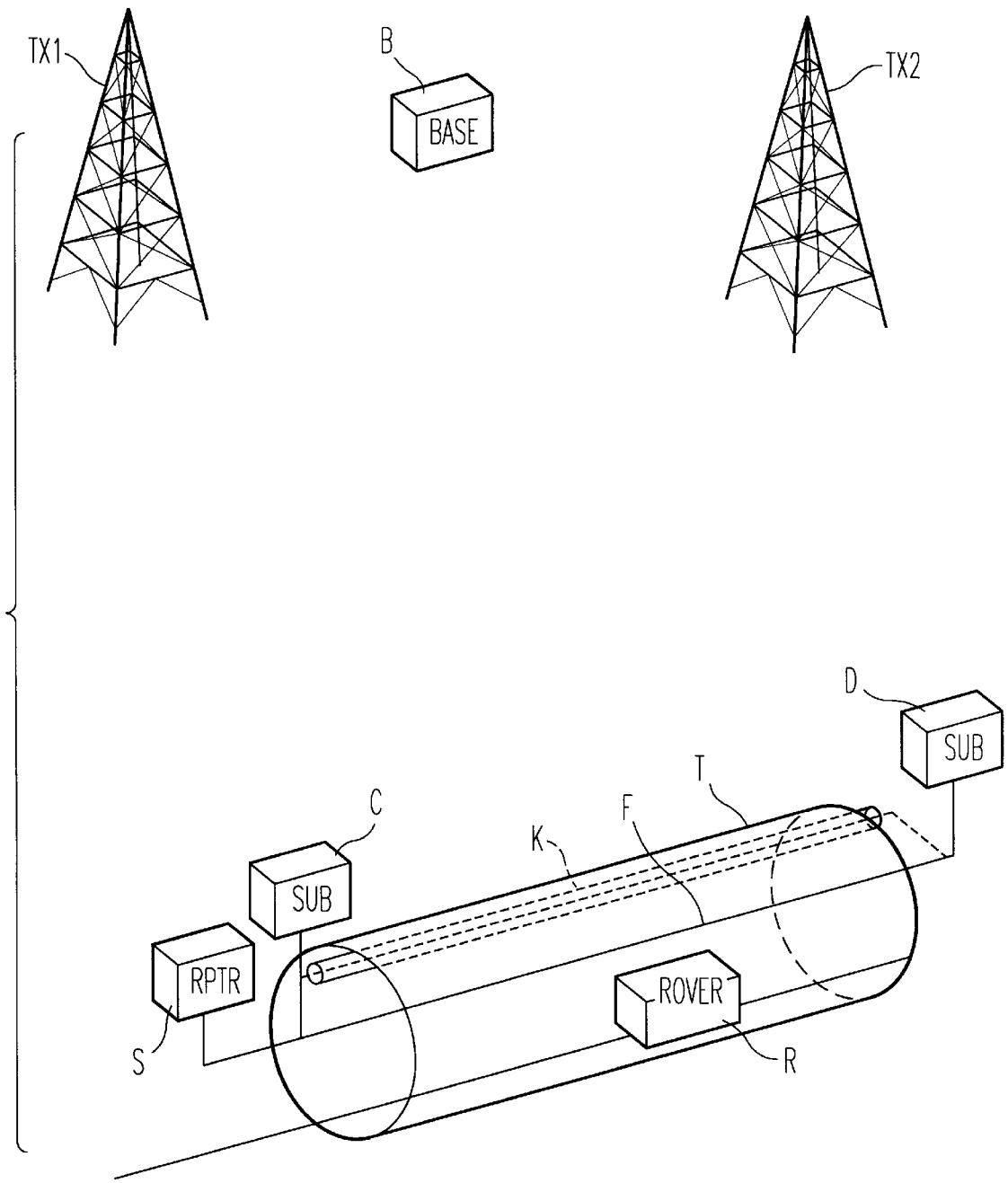
FIG. 4 is a diagrammatic representation of a practical implementation of a CURSOR™ system showing operation both inside and outside a tunnel.

As the rover R enters a tunnel T, the signals received directly from the transmitters Tx on channels 3 to 8 rapidly fade out. They are replaced by sinusoids of the same frequency, generated by oscillators in equipment D, at the far end of the tunnel T locked in phase with the carrier waves received directly from the respective transmitters Tx at that end, radiated inside the tunnel from a leaky cable (the curvilinear structure F) laid along its length (see FIG. 4). These channels are not used for calculation of the rover's position inside the tunnel. However, the constant phase offsets of the locally-generated substitute signals are arranged such that they match those of the directly-received carrier waves at the far end, thus ensuring that these channels can be used immediately the rover emerges from the tunnel for normal CURSOR™ operation. Channels 1 and 2 are used in the manner described earlier for monitoring the position of the rover R inside the tunnel T.

Figure 7:
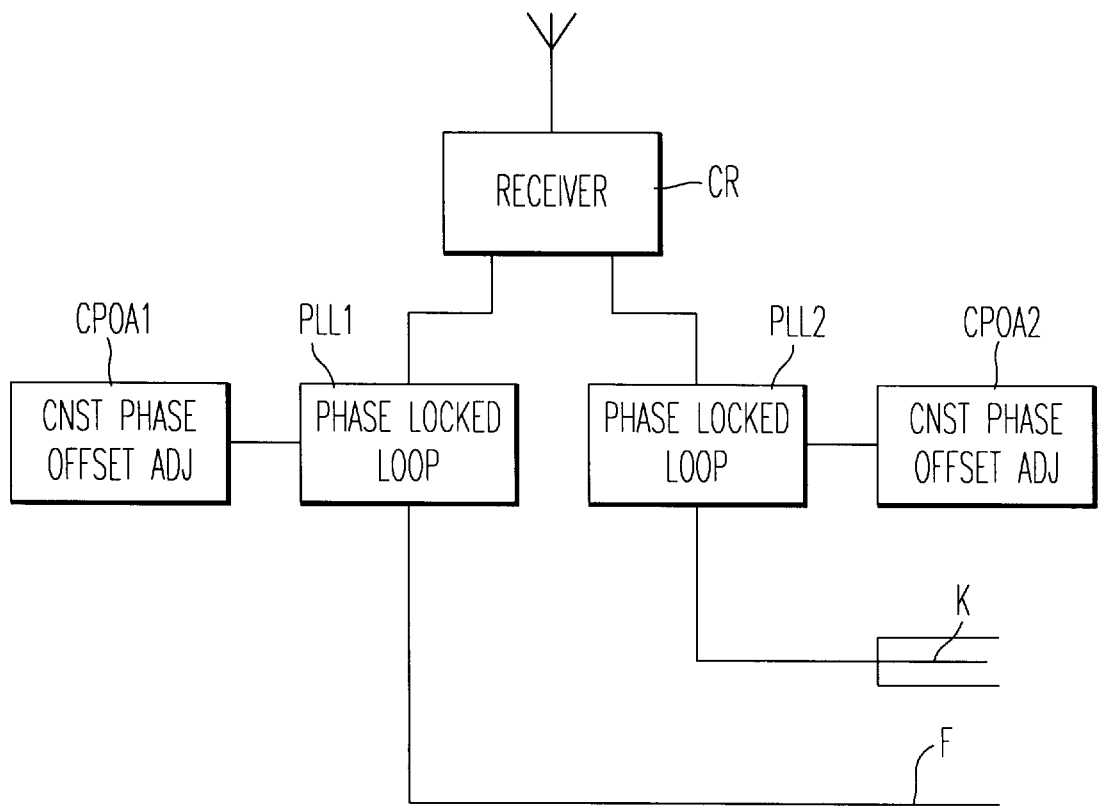
FIG. 7 is a block diagram representation of equipment used to generate signals received by the roving receiver within the shielded space.

The AM signals received directly from the transmitters on these two channels quickly fade out as the rover enters the tunnel, but are replaced by substitute sinusoids of the same frequency. These substitute signals are generated by equipment C (see FIG. 7) at the entrance of the tunnel and are locked in phase with the respective carrier waves received directly. Their constant phase offsets are adjusted to match the directly-received signals at the entrance, thus ensuring a smooth transition into the tunnel. The substitute signal on channel 1 is propagated down the same leaky cable used for channels 3–8 in the direction from entrance to exit. The substitute signal on channel 2, however, is first conveyed to the far end of the tunnel by a fully screened cable K where it is then injected into the leaky cable F so that it propagates in the opposite direction to that of the signal on channel 1. The rover R receives the signals on channels 1 and 2, together with the numbers sent via the radio link (equipment S) which represent the phases of the signals received directly at the base station B, to compute its position inside the tunnel T using equations (5) and (6). The radio link itself is established inside the tunnel by radiation from the same leaky cable F as is being used for the navigation signals. The equipment C (see FIG. 7) comprises a receiver CR which receives the signals from the transmitters Tx1,Tx2 and which passes the channel 1 and channel 2 signals to respective phase-lock-loops PLL1 and PLL2, each of which has an input from a constant phase offset adjustment device CPOA1,CPOA2. The respective outputs of the phase-lock-loops feed the substitute sinusoids down the leaky cable F and the shielded cable K respectively. The equipment D is similar to that of C illustrated in FIG. 7, but has 6 channels each corresponding to those of equipment C and feeds each substitute sinusoid to the leaky cable F.

In setting up such a system as has just been described, it is important to ensure that the navigation signals on channels 1 and 2 are present on the leaky cable only as travelling waves with no standing-wave components. Some care is therefore needed to ensure that the cable is of sufficiently-good quality, is laid sufficiently carefully, and is properly terminated at both ends. Any standing-wave component on the cable will give rise to a phase measurement which does not vary linearly with distance. For a CURSOR™ system operating at FM frequencies such as described in EP-B-0 303 371, a standard leaky cable such as RPC 7795 (from BICC) might be suitable. However, at lower frequencies a more open structure may be required such as would be provided by a pair of parallel wires extending down the length of the tunnel spaced about 1 meter apart.

Figure 5A:
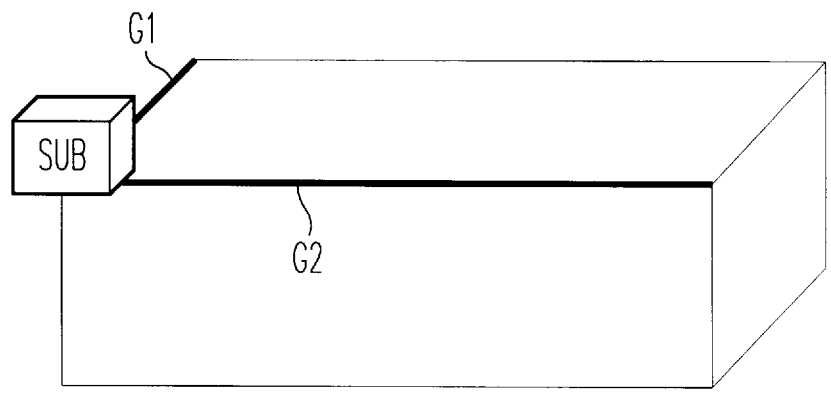
FIG. 5a illustrates the use of a similar system for position location within a two-dimensional shielded field.
Figure 5B:
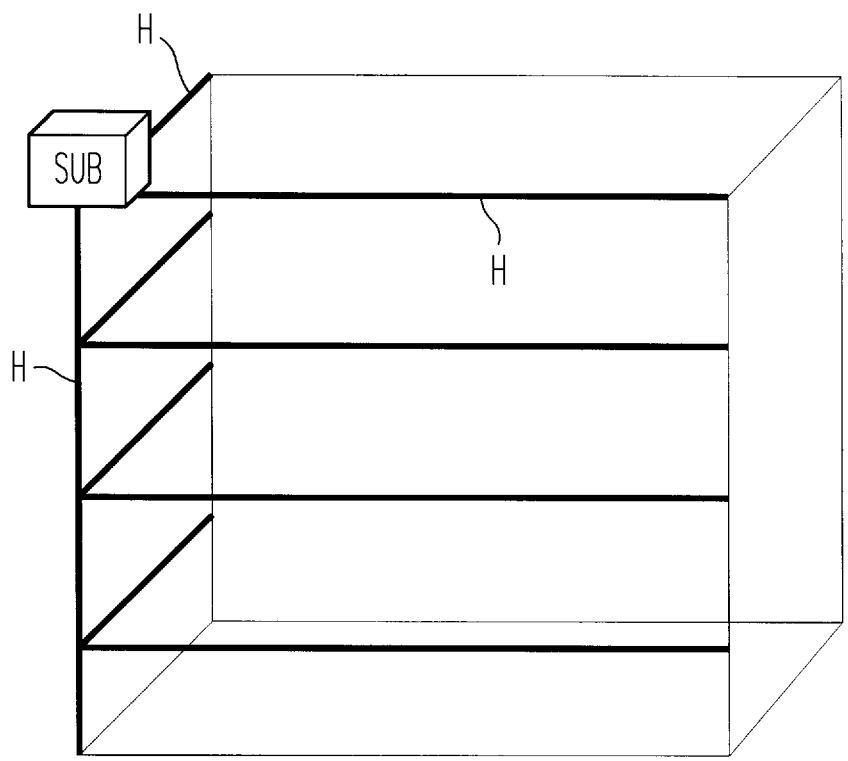
FIG. 5b illustrates the use of a similar system for position location within a three-dimensional shielded field.

The concept described above, in which a CURSOR™ system can be made to operate in one dimension inside a tunnel, can be generalised to include operation in both open and shielded spaces, where the position of the roving object can be tracked in one, two, or three dimensions using the signal from one or more spacially-extended signal sources. For example, the two-dimensional position of a roving object could be measured inside an underground car park using signals from two curvilinear structures $G_1, G_2$ set at right angles to each other (see FIG. 5a); or the three-dimensional position of a roving object could be measured inside a multi-storey building using the signals from three orthogonal curvilinear structures H (see FIG. 5b). Analysis of the two-dimensional case (FIG. 5a) is sufficient to illustrate multi-dimensional operation as follows.

Figure 6:
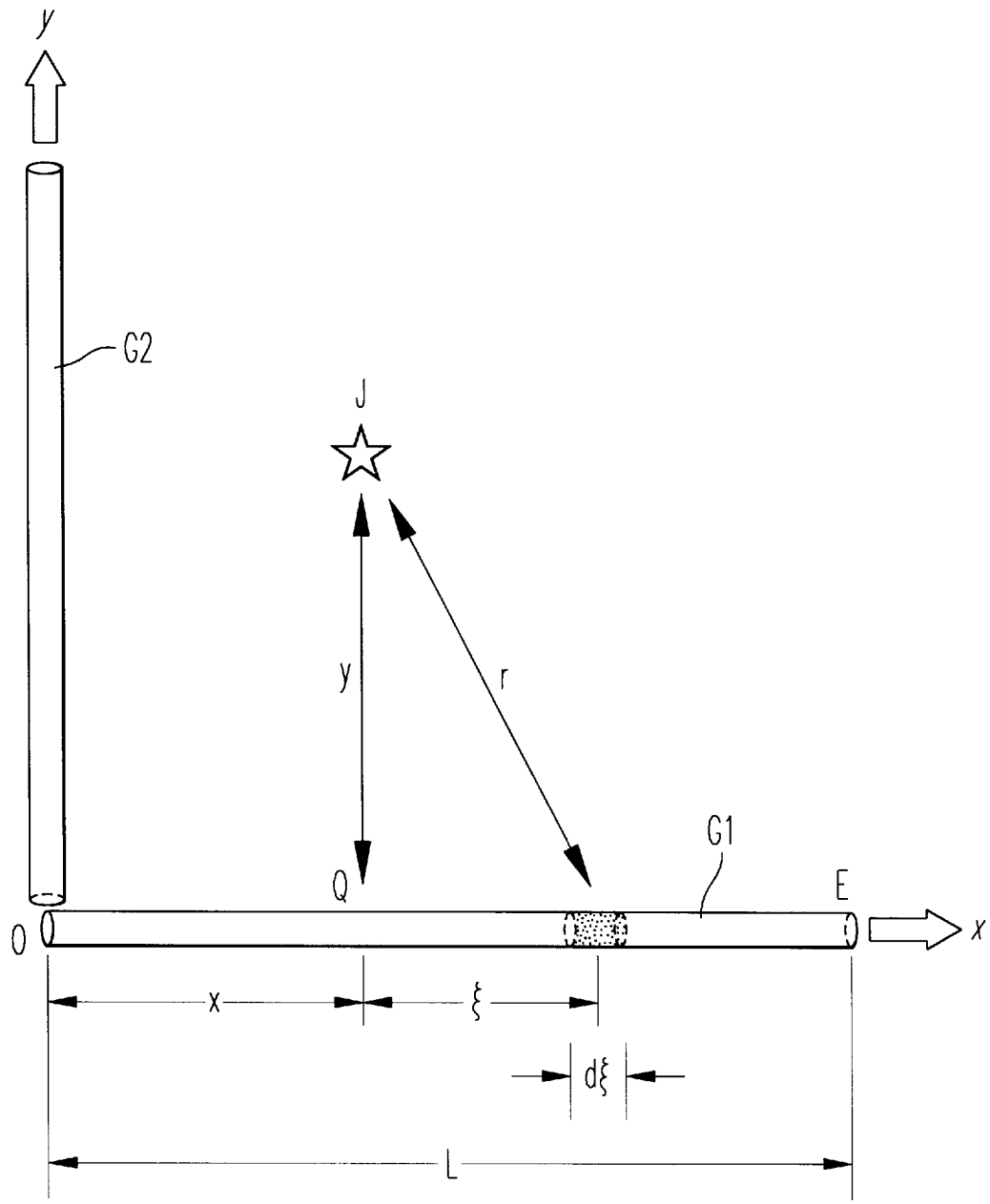

The geometry of two-dimensional operation using spacially extended signal sources is shown in FIG. 6. The signals from curvilinear structures $G_1, G_2$ are received by the rover R at J, position (x,y), with respect to the origin of coordinates at O. If $d\xi$ is a small element of $G_1$ at distance $(x+\xi)$ from O, then the contribution to the total amplitude of the signals received at J from this element is $$d\psi_1 = f(\xi, y) \exp(jk_1 r) \exp(jk_1'(x+\xi)) d\xi, \tag{7}$$

where $\exp(jk_1 r)$ is the phase factor for the signals propagating in air over the path (length r) from the element to J, $k_1$ is the wave-number of the signals in air on channel number 1, and $k_1'$ is the wave-number of the signals propagating along the curvilinear structure $G_1$. The term $f(\xi, y)$ is a real symmetric function describing the attenuation with angle and distance of the signal from the line element $d\xi$. Its precise form depends on the construction of the curvilinear structure $G_1$. In the general case the total signal at J is therefore given by $$\psi_1 = \exp(jk_1'x) \int_a^b f(\xi, y) \exp(jk_1(y^2+\xi^2)^{1/2} + jk_1'\xi) d\xi. \tag{8}$$

The limits of the integration, a and b, correspond to the values of $\xi$ at the two ends of the linear structure. If the structure is sufficiently long, $f(\xi, y)$ will have a vanishingly small value for the more distant elements so that the limits of the integration can be extended to $\pm\infty$).

As with one-dimensional operation, the signals from a second frequency channel may be sent along the cable from the far end E giving $$\psi_2 = \exp(jk_2'(L-x)) \int_a^b f(\xi, y) \exp(jk_2(y^2+\xi^2)^{1/2} + jk_2'\xi) d\xi, \tag{9}$$

where L is the length of the curvilinear structure $G_1$. Equations 8 and 9 contain two unknown quantities, x and y, and so would be sufficient to solve for the two-dimensional position (x,y) if the time was universally defined and agreed upon at J, O and E. However, as with any other CURSOR™ or similar system, the measured quantity is the difference in the phase measured at the base-station B and the rover R, this being affected by an unknown and varying time offset, $\epsilon$, between the master oscillators at the two points. Hence three independent equations are needed. The third measurement must have a different time delay from the other two and can be obtained from signals sent at a third frequency along another curvilinear structure, $G_2$, set at as large an angle as possible with respect to $G_1$ (preferably 90°). The signal received from $G_2$ at J is then $$\psi_3 = \exp(jk_3'y) \int_c^d f(\xi,x)\exp(jk_3(x^2 + \xi^2)^{1/2} + jk_3'\xi)d\xi, \quad (10)$$

where c and d correspond to the values of $\xi$ for the two ends of $G_2$.

All the signals received at J, $\psi_i$, can be written in the form $$\psi_i = A(x,y)\exp(j\omega_i(g(x,y)+\delta)), \quad (11)$$

where A is a real function of (x,y), $\omega_i$ is the angular frequency of the signals on channel i, g(x,y) is a real function of (x,y) and $\delta$ is the time drift of the master oscillator in the rover since the start of measurements. The phase difference, $\Delta\phi_i$, of the signals at the base station and the rover can therefore be written as $$\Delta\phi_i = \omega_i(g(x,y)+\epsilon). \quad (12)$$

Three or more such equations from independent frequency channels can then be used to deduce the values of x,y and $\epsilon$, and hence the position of the rover may be found. In practice, many more than the minimum three frequencies can be used giving much increased accuracy through averaging, and reducing the susceptibility of the system to gross errors. It may also be an advantage to set up more than the minimum number of curvilinear structures. For example, a structure might be fixed along each side of an enclosed space. It will be appreciated that the equipment required to carry out the signal transmission & reception, signal comparisons & calculations, etc. can be substantially as described in EP-B-0 303 371, although the signals sent from the transmission sources may be AM rather than FM radio signals, as described earlier.

A similar system to the above may be used for navigation solely within the region of space covered by fields from the extended transmission elements. Under these circumstances it may not be necessary to lock the phases of the signals passed along the transmission elements to those of external transmitters, and they may therefore be generated by local independent equipment. These signals may be generated at the rover, at the base station, at some other point, or at a combination of the three, but must still be passed along the curvilinear transmission element or elements in opposite directions. In the one-dimensional case there must be at least two such signals travelling in opposite directions and with different frequencies. Additional signals may duplicate these directions and frequencies and may be of use in adding redundancy to the system.

Applications for such a navigation system need not be wholly within a tunnel or any other physically enclosed space. For example, if the curvilinear transmission elements were 'leaky' cables laid beneath or alongside the lanes of a storage depot, vehicles could be tracked as they travelled along the routes and deposited or withdrew items from store. In such a system, the cable might be laid in such a way that it formed a single loop, with the two ends meeting at the base station. The base could then generate two navigation signals and send them in opposite directions around the loop. The same cable could be used for the link between the roving vehicle or vehicles and the base-station. A precise knowledge of the shape of the cable loop would allow the base-station to keep track of the two-dimensional position of a number of roving vehicles. In general, knowledge of both the one-dimensional position of the rover with respect to a curvilinear element and the disposition of that element in three dimensions will give the full three-dimensional position of the rover.

In common with the basic CURSOR™ system, the link between the moving ("rover") and fixed ("based-station") positions need not be made in real-time. Both the rover and the base-station may record the signals in a convenient form (e.g., on a floppy disk) to be replayed and processed later. In this way the progress of the rover may be recorded in a way similar to the more familiar tachograph and be inspected at a later time.

We claim:

1. Apparatus for use with a navigation and/or tracking system having a base station and a roving receiver both of which are capable of receiving signals from a plurality of transmission sources, and between which a link signal is passed to enable the relative location of the roving receiver to be determined, the apparatus enabling the determination of the position of the roving receiver within a space shielded from direct receipt of signals from the transmission sources and comprising means for producing substitute signals, each signal being either locked in phase with a signal from a respective one of the transmission sources or a replica of it; a curvilinear transmission element or elements extending within the shielded space for generating fields in the shielded space; means for propagating at least two of the substitute signals in opposite directions along the curvilinear transmission element or elements for receipt by the roving receiver; and means for passing the link signal between the roving receiver and the base station.

2. Apparatus according to claim 1, wherein the means for passing the link signal between the roving receiver and the base station includes means for receiving signals from the rover within the shielded space.

3. A system according to claim 2, further comprising a plurality of roving receivers.

4. A navigation and tracking system having a base station and a roving receiver both of which are capable of receiving signals from a plurality of transmission sources, and between which a link signal is passed to enable the relative location of the roving receiver to be determined, and including apparatus enabling the determination of the position of the roving receiver within a space shielded from direct receipt of signals from the transmission sources and comprising means for producing substitute signals, each signal being either locked in phase with a signal from a respective one of the transmission sources or a replica of it; a curvilinear transmission element or elements extending within the shielded space for generating fields in the shielded space; means for propagating at least two of the substitute signals in opposite directions along the curvilinear transmission element or elements for receipt by the roving receiver; and means for passing the link signal between the roving receiver and the base station.

5. A navigation and tracking system according to claim 4, wherein the means for passing the link signal between the roving receiver and the base station includes means for receiving signals from the rover within the shielded space.

6. A system according to claim 5, further comprising a plurality of roving receivers.

7. A navigation and tracking system according to claim 5, wherein the transmission signals are modulated and timing delays between the respective signals are determined in order to enable the relative location of the roving receiver to be determined.

8. A navigation and tracking system according to claim 7, wherein the substitute signals are replicas of the transmitted signals, and the system including means for comparing the signals received by the base station and roving receiver, which includes means for correlating the signals to produce estimates of a cross-correlation function to determine the time delay between the signals.

9. A system according to claim 5, wherein the transmission signals are modulated and a phase difference is determined.

10. A navigation and tracking system according to claim 4, wherein the transmission signals are modulated and timing delays between the respective signals are determined in order to enable the relative location of the roving receiver to be determined.

11. A system according to claim 10, further comprising a plurality of roving receivers.

12. A navigation and tracking system according to claim 10, wherein the substitute signals are replicas of the transmitted signals, and the system including means for comparing the signals received by the base station and roving receiver, which includes means for correlating the signals to produce estimates of a cross-correlation function to determine the time delay between the signals.

13. A system according to claim 12, further comprising a plurality of roving receivers.

14. A system according to claim 4, wherein the transmission signals are modulated and a phase difference is determined.

15. A system according to claim 14, wherein the means for passing the link signal between the roving receiver and the base station includes means for receiving signals from the rover within the shielded space.

16. A system according to claim 14, further comprising a plurality of roving receivers.

17. A system according to claim 4, further comprising a plurality of roving receivers.

18. A navigation and tracking system for location finding within an electromagnetically shielded space, the apparatus having a base station and a roving receiver, both of which receive signals from a plurality of signal generators, and between which a link signal is passed to enable the relative location of the roving receiver to be determined, one or more curvilinear transmission elements extending within the shielded space for generating fields in the shielded space; means for propagating the generated signals in opposite directions along the curvilinear transmission element or elements for receipt by the roving receiver; and means for passing a link signal, representative of the signals received by the rover or base station, between the roving receiver and the base station; and means for comparing the signal representations received via the link with the signals directly received, in order to determine the location of the rover.

19. A system according to claim 18, further comprising a plurality of roving receivers.

* * * * *